US006769879B1

United States Patent
Cleveland et al.

(10) Patent No.: US 6,769,879 B1
(45) Date of Patent: Aug. 3, 2004

(54) AIRFOIL SHAPE FOR A TURBINE BUCKET

(75) Inventors: Peter Gaines Cleveland, Greenville, SC (US); Thomas Bradley Beddard, Simpsonville, SC (US); Scott Matthew Sparks, Simpsonville, SC (US); Joseph Anthony Weber, Simpsonville, SC (US); James Bernard Fehlberg, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/616,911

(22) Filed: Jul. 11, 2003

(51) Int. Cl.[7] .................................................. F01D 5/14
(52) U.S. Cl. ............... 416/243; 416/223 A; 416/DIG. 2
(58) Field of Search .......................... 416/223 R, 223 A, 416/243, DIG. 2, DIG. 5; 415/191, 192, 208.1, 208.2, 211.2

(56) References Cited

U.S. PATENT DOCUMENTS

| 5,980,209 | A | * | 11/1999 | Barry et al. | ............. | 416/223 A |
| 6,450,770 | B1 | * | 9/2002 | Wang et al. | ............. | 416/223 A |
| 6,461,110 | B1 | * | 10/2002 | By et al. | ................ | 416/223 A |
| 6,474,948 | B1 | * | 11/2002 | Pirolla et al. | ................ | 416/243 |
| 6,503,059 | B1 | * | 1/2003 | Frost et al. | ............. | 416/223 A |
| 6,685,434 | B1 | * | 2/2004 | Humanchuk et al. | ... | 416/223 A |
| 6,715,990 | B1 | * | 4/2004 | Arness et al. | ........... | 416/223 A |
| 6,722,851 | B1 | * | 4/2004 | Brittingham et al. | ..... | 416/96 R |
| 6,722,852 | B1 | * | 4/2004 | Wedlake et al. | ........ | 416/223 A |

\* cited by examiner

Primary Examiner—Christopher Verdier
(74) Attorney, Agent, or Firm—Nixon & Vanderhye

(57) ABSTRACT

First stage turbine buckets have airfoil profiles substantially in accordance with Cartesian coordinate values of X, Y and Z set forth Table I wherein X and Y values are in inches and the Z values are non-dimensional values from 0.05 span to 0.95 span convertible to Z distances in inches by multiplying the Z values by the height of the airfoil in inches. The X and Y values are distances which, when connected by smooth continuing arcs, define airfoil profile sections at each distance Z. The profile sections at each distance Z are joined smoothly to one another to form a complete airfoil shape. The X, Y and Z distances may be scalable as a function of the same constant or number to provide a scaled up or scaled down airfoil section for the bucket. The nominal airfoil given by the X, Y and Z distances lies within an envelope of ±0.150 inches in directions normal to the surface of the airfoil.

22 Claims, 6 Drawing Sheets

AIRFOIL SHAPE FOR A TURBINE BUCKET

BACKGROUND OF THE INVENTION

The present invention relates to an airfoil for a bucket of a stage of a gas turbine and particularly relates to a first stage turbine bucket airfoil profile.

Many system requirements must be met for each stage of the hot gas path section of a gas turbine in order to meet design goals including overall improved efficiency and airfoil loading. Particularly, the buckets of the first stage of the turbine section must meet the thermal and mechanical operating requirements for that particular stage.

BRIEF DESCRIPTION OF THE INVENTION

In accordance with the preferred embodiment of the present invention there is provided a unique airfoil shape for a bucket of a gas turbine, preferably the first stage bucket, that enhances the performance of the gas turbine. The present airfoil shape is a modification of a prior airfoil design. Specifically, by reshaping the trailing edge from the prior known design, the present airfoil is unique and not a direct scale of the prior known bucket airfoils. More specifically, cutbacks are applied to the trailing edge of the prior known design, particularly along its entire length, affording a wholly new overall airfoil profile.

The bucket airfoil profile hereof is defined by a unique loci of points to achieve the necessary efficiency, and loading requirements. These unique loci of points define the nominal airfoil profile and are identified by the X, Y and Z Cartesian coordinates of Table I which follows. The 1000 points for the coordinate values shown in Table I are relative to the turbine centerline and for a cold, i.e., room temperature bucket at various cross-sections of the bucket airfoil along its length. The positive X, Y and Z directions are axial toward the exhaust end of the turbine, tangential in the direction of engine rotation and radially outwardly toward the bucket tip, respectively. The X and Y coordinates are given in distance dimensions, e.g., units of inches, and are joined smoothly at each Z location to form a smooth continuous airfoil cross-section. The Z coordinates are given in non-dimensionalized form from 0.05 (5%) span to 0.95 (95%) span. By multiplying the airfoil height dimension, e.g., in inches, by the non-dimensional Z value of Table I, the airfoil shape, i.e., the profile, of the bucket airfoil is obtained. Each defined airfoil section in the X, Y plane is joined smoothly with adjacent airfoil sections in the Z direction to form the complete airfoil shape. The resulting airfoil particularly has a trailing edge cutback as compared with a prior known bucket.

It will be appreciated that as each bucket airfoil heats up in use, the profile will change as a result of mechanical loading and temperature. Thus, the cold or room temperature profile is given by the X, Y and Z coordinates for manufacturing purposes. Because a manufactured bucket airfoil profile may be different from the nominal airfoil profile given by the following table, a distance of plus or minus 0.150 inches from the nominal profile in a direction normal to any surface location along the nominal profile and which includes any coating, defines a profile envelope for this bucket airfoil. The airfoil shape is robust to this variation without impairment of the mechanical and aerodynamic functions of the bucket.

It will also be appreciated that the airfoil can be scaled up or scaled down geometrically for introduction into similar turbine designs. Consequently, the X and Y coordinates in inches and the non-dimensional Z coordinates, when converted to inches, of the nominal airfoil profile given below may be a function of the same constant or number. That is, the X and Y coordinate values in inches, and optionally the Z coordinate values when converted to inches, may be multiplied or divided by the same constant or number to provide a scaled up or scaled down version of the bucket airfoil profile while retaining the airfoil section shape.

In a preferred embodiment according to the present invention, there is provided a turbine bucket including a bucket airfoil having an airfoil shape, the airfoil having a nominal profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape.

In a further preferred embodiment according to the present invention, there is provided a turbine bucket including a bucket airfoil having an uncoated nominal airfoil profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X and Y distances being scalable as a function of the same constant or number to provide a scaled-up or scaled-down airfoil.

In a further preferred embodiment according to the present invention, there is provided a turbine comprising a turbine wheel having a plurality of buckets, each of the buckets including an airfoil having an airfoil shape, the airfoil having a nominal profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define the airfoil profile sections at each distance Z, the profile sections at the Z distances being joined smoothly with one another to form a complete airfoil shape.

In a further preferred embodiment according to the present invention, there is provided a turbine comprising a turbine wheel having a plurality of buckets, each of the buckets including an airfoil having an uncoated nominal airfoil profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape, the X, Y and Z distances being scalable as a function of the same constant or number to provide a scaled-up or scaled-down bucket airfoil.

DETAILED DESCRIPTION OF THE INVENTION

Figure 1:
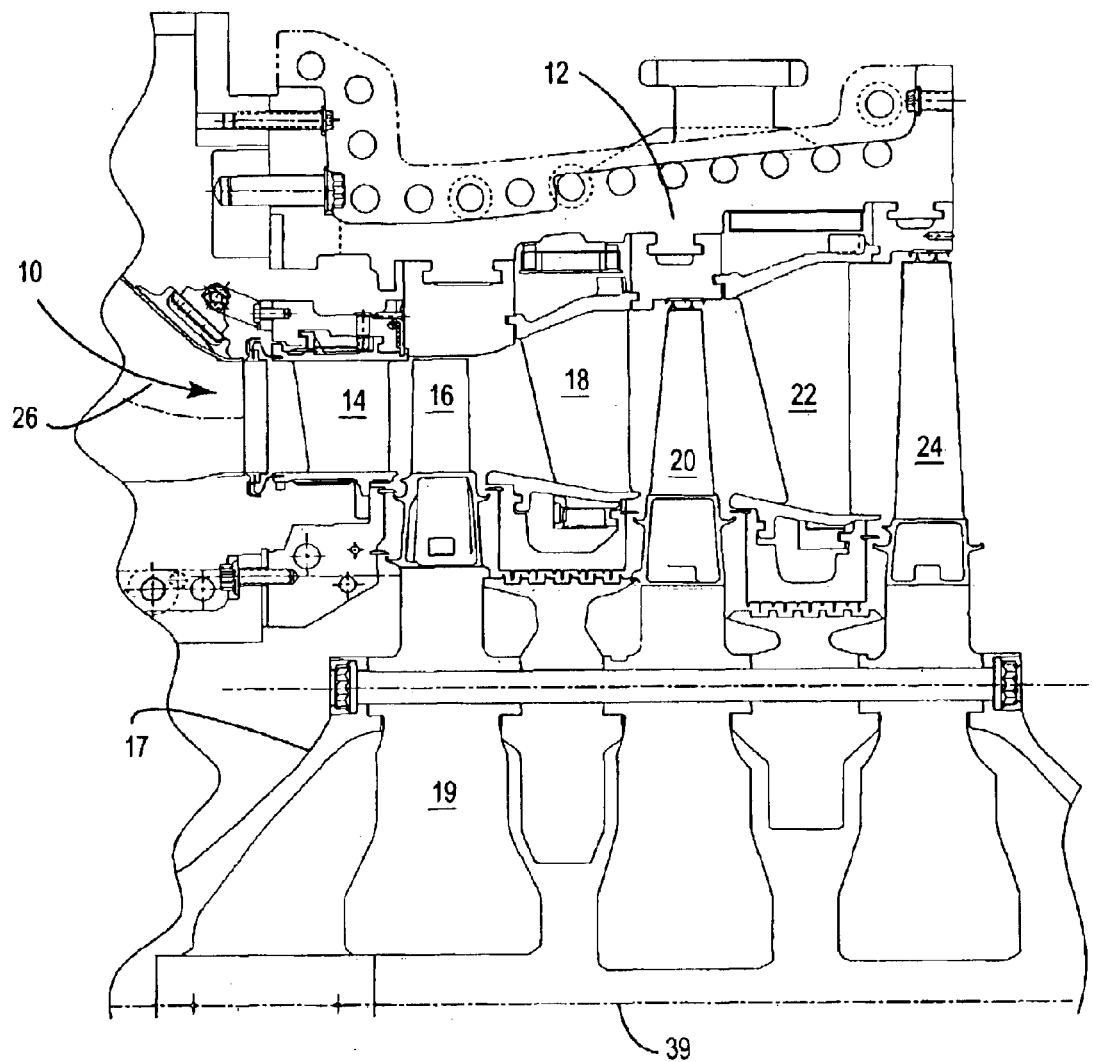
FIG. 1 is a schematic representation of a hot gas path through multiple stages of a gas turbine and illustrates a first stage bucket airfoil according to a preferred embodiment of the present invention.

Referring now to the drawings, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor 17. A second stage of the turbine 12 is also illustrated, including a plurality of circumferentially spaced nozzles 18 and a plurality of circumferentially spaced buckets 20 mounted on the rotor 17. The third stage is also illustrated including a plurality of circumferentially spaced nozzles 22 and buckets 24 mounted on rotor 17. It will be appreciated that the nozzles and buckets lie in the hot gas path 10 of the turbine, the direction of flow of the hot gas through the hot gas path 10 being indicated by the arrow 26.

Figure 2:
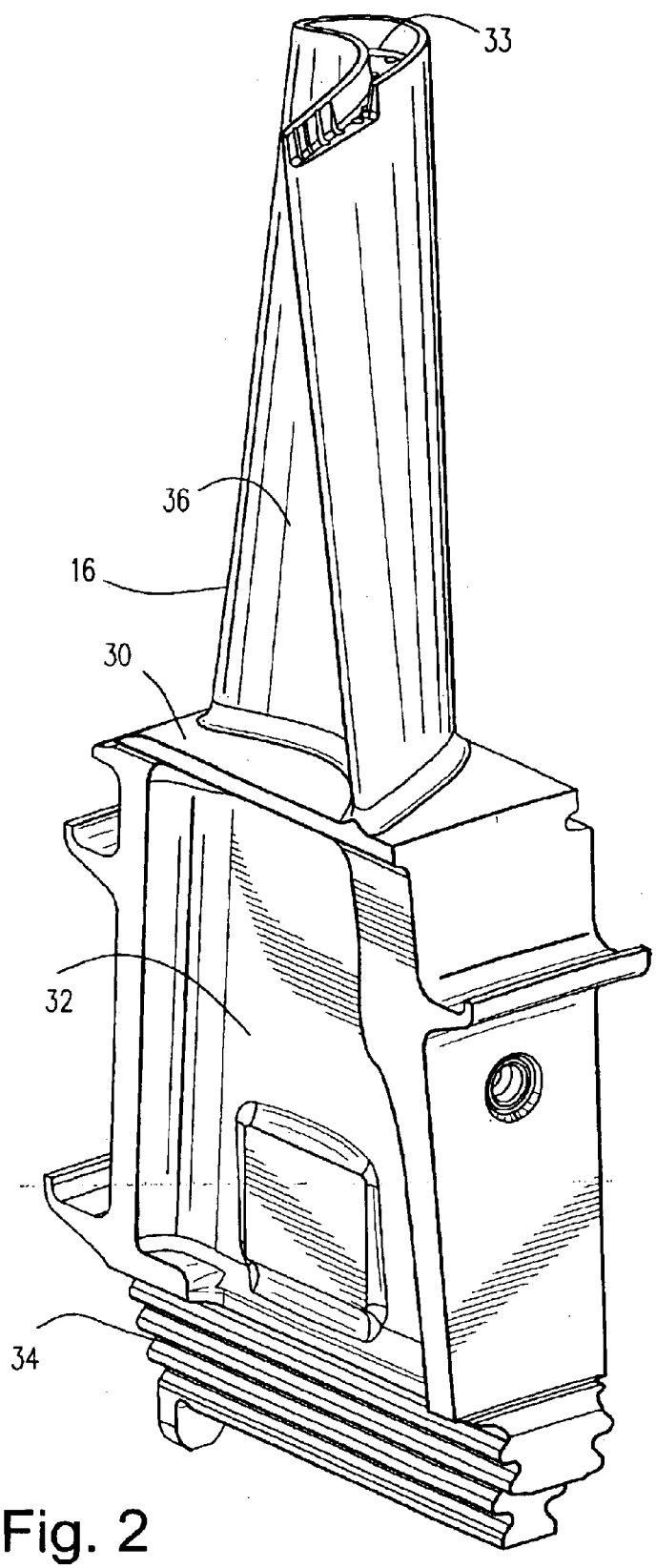
FIG. 2 is a perspective view of the bucket according to a preferred embodiment of the present invention with the bucket airfoil illustrated in conjunction with its platform, shank and near-axial entry dovetail connection.
Figure 3:
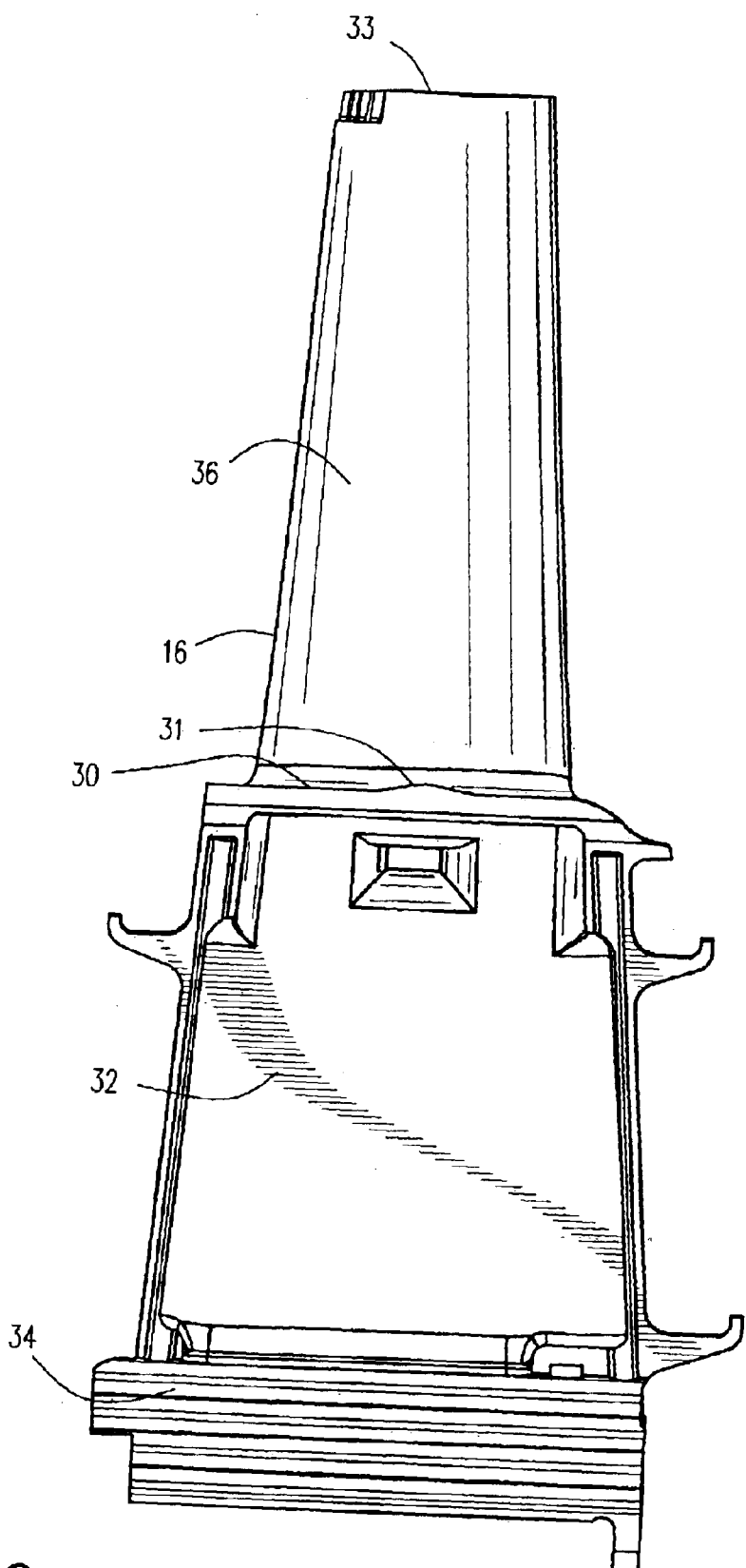
FIG. 3 is a side elevational view of the bucket of FIG. 2.
Figure 4:
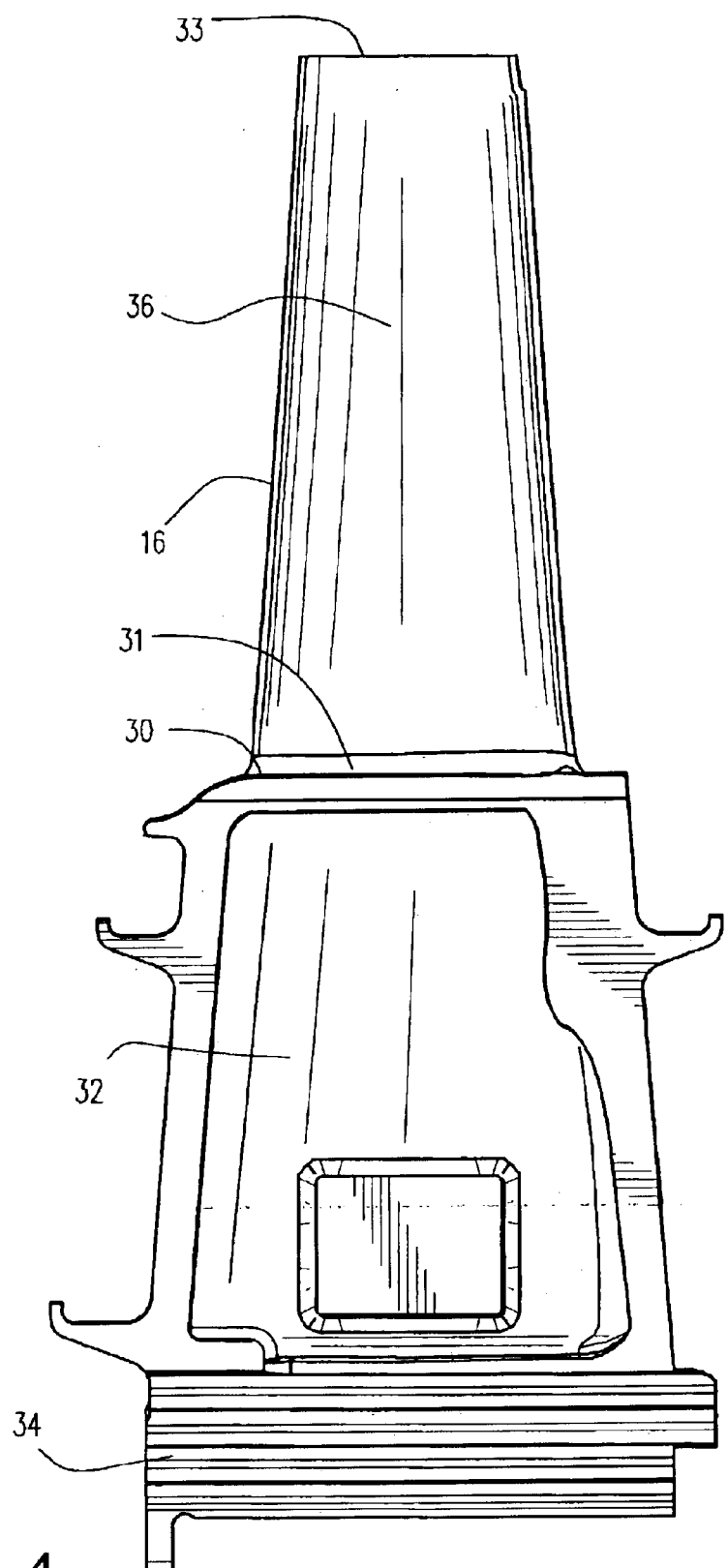
FIG. 4 is an opposite side elevational view thereof.
Figure 5:
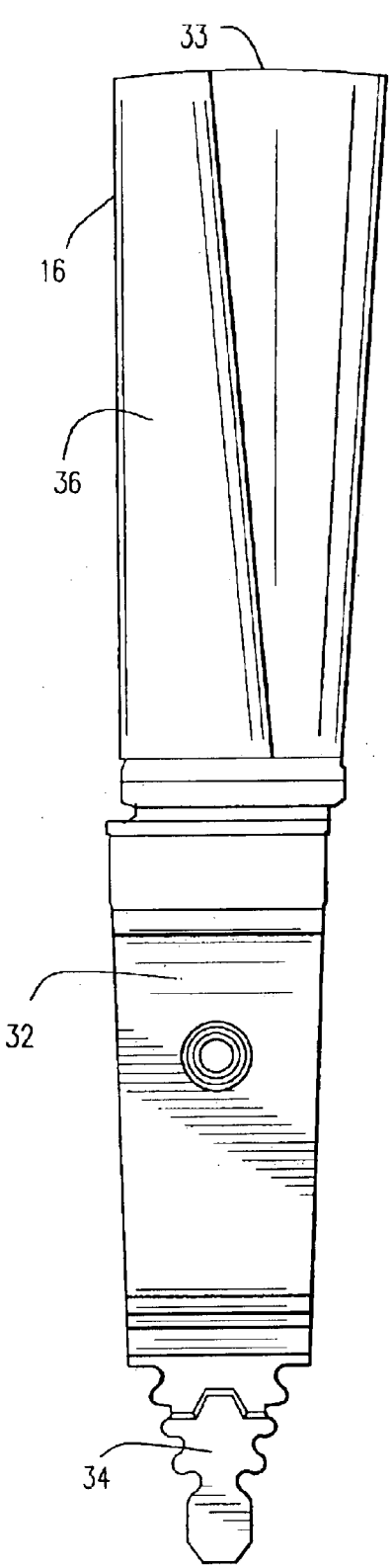
FIGS. 5 and 6 are respective opposite end views of the bucket as viewed from the leading and trailing edges of the airfoil.
Figure 6:
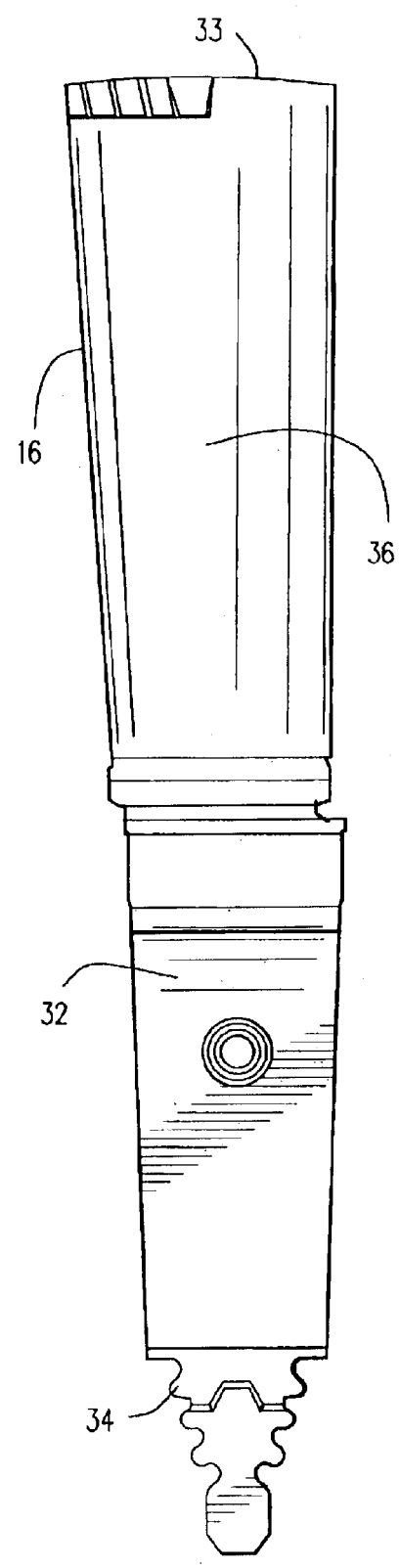
Figure 7:
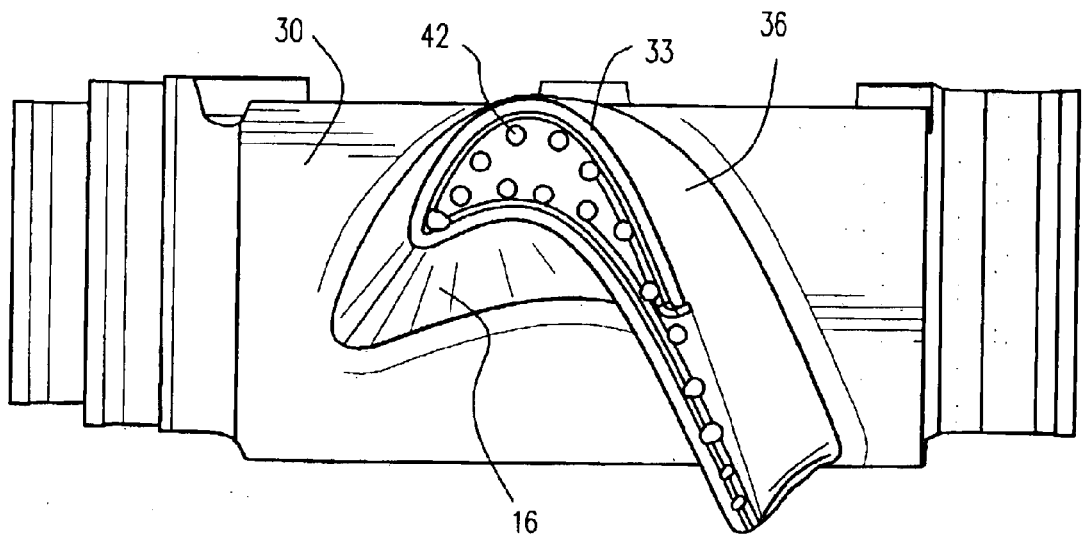
FIG. 7 is a top plan view looking radially inwardly from the tip of the bucket.

It will be appreciated that the buckets, for example, the buckets 16 of the first stage are mounted on a rotor wheel 19 forming part of rotor 17. Each bucket 16 is provided, as illustrated in FIGS. 2 and 3, with a platform 30, a shank 32 and an axial dovetail 34 for connection with a complementary-shaped mating dovetail, not shown, on the rotor wheel 19. It will also be appreciated that each bucket 16 has a bucket airfoil 36. Thus, each of the buckets 16 has a cross-sectional airfoil profile at any cross-section from the airfoil root 31 (FIG. 3) at a midpoint of platform 30 to the bucket tip 33 in the shape of an airfoil.

To define the airfoil shape of each first stage bucket airfoil, there is a unique set or loci of points in space that meet the stage requirements and can be manufactured. This unique loci of points meets the requirements for stage efficiency and reduced thermal and mechanical stresses. The loci of points are arrived at by iteration between aerodynamic and mechanical loadings enabling the turbine to run in an efficient, safe and smooth manner. The loci which defines the bucket airfoil profile comprises a set of 1000 points relative to the axis of rotation of the turbine. A Cartesian coordinate system of X, Y and Z values given in Table 1 below defines the profile section of the bucket airfoil at various locations along its length. The coordinate values for the X and Y coordinates are set forth in inches in Table I although other units of dimensions may be used when the values are appropriately converted. The Z values are set forth in Table I in non-dimensional form from 0.05 (5%) span to 0.95 (95% span). To convert the Z value to a Z coordinate value, e.g., in inches, the non-dimensional Z value given in Table I is multiplied by the height of the airfoil 36 in inches. The Cartesian coordinate system has orthogonally-related X, Y and Z axes and the X axis lies parallel to the turbine rotor centerline, i.e., the rotary axis and a positive X coordinate value is axial toward the aft, i.e., exhaust end of the turbine. The positive Y coordinate value looking aft extends tangentially in the direction of rotation of the rotor and the positive Z coordinate value is generally radially outwardly toward the bucket tip.

Figure 8:
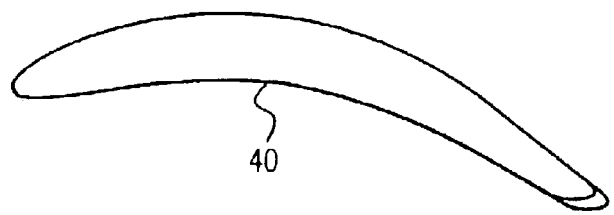
FIG. 8 is a representative airfoil profile section taken generally about a mid-span portion of the airfoil hereof.

By defining X and Y coordinate values at selected locations in a Z direction normal to the X, Y plane, the bucket airfoil profile section, e.g., profile section 40 of FIG. 8, at each Z distance along the length of the airfoil can be ascertained. By connecting the X and Y values with smooth continuing arcs, each profile section 40 at each distance Z is fixed. The airfoil profile sections 40 of the various surface locations between the distances Z are determined by smoothly connecting the adjacent profile sections to one another to form the entire airfoil profile. These values represent the airfoil profile sections at ambient, non-operating or non-hot conditions and are for an uncoated airfoil.

The Table I values for X and Y are generated and shown to four decimal places for determining the profile of the airfoil. The fourth decimal place, however, is not significant and may be rounded up or down. There are typical manufacturing tolerances as well as coatings which must be accounted for in the actual profile of the airfoil. Accordingly, the values for the airfoil profile given in Table I are for a nominal airfoil. It will therefore be appreciated that ± typical manufacturing tolerances, i.e., ± values, including any coating thicknesses., are additive to the X and Y values given in Table I below. Accordingly, a distance of ±0.150 inches in a direction normal to any surface location along the airfoil profile defines an airfoil profile envelope for this particular bucket airfoil design and turbine, i.e., a range of variation between measured points on the actual airfoil surface at nominal cold or room temperature and the ideal position of those points as given in the Table below at the same temperature. The bucket airfoil design is robust to this range of variation without impairment of mechanical and aerodynamic functions.

The coordinate values given in Table I below provide the preferred nominal profile envelope.

TABLE I

| X Inches | Y Inches | Z % Span |
|---|---|---|
| −1.3594 | −0.5213 | 0.05 |
| −1.2754 | −0.5233 | 0.05 |
| −1.1942 | −0.4993 | 0.05 |
| −1.1157 | −0.4673 | 0.05 |
| −1.0376 | −0.4344 | 0.05 |
| −0.9588 | −0.4030 | 0.05 |
| −0.8792 | −0.3740 | 0.05 |
| −0.7987 | −0.3474 | 0.05 |
| −0.7176 | −0.3227 | 0.05 |
| −0.6361 | −0.2995 | 0.05 |
| −0.5541 | −0.2782 | 0.05 |
| −0.4715 | −0.2592 | 0.05 |

TABLE I-continued

| X Inches | Y Inches | Z % Span |
|---|---|---|
| −0.3883 | −0.2431 | 0.05 |
| −0.3045 | −0.2302 | 0.05 |
| −0.2202 | −0.2208 | 0.05 |
| −0.1357 | −0.2155 | 0.05 |
| −0.0509 | −0.2144 | 0.05 |
| 0.0338 | −0.2180 | 0.05 |
| 0.1181 | −0.2264 | 0.05 |
| 0.2018 | −0.2399 | 0.05 |
| 0.2845 | −0.2583 | 0.05 |
| 0.3659 | −0.2818 | 0.05 |
| 0.4458 | −0.3101 | 0.05 |
| 0.5239 | −0.3430 | 0.05 |
| 0.6000 | −0.3804 | 0.05 |
| 0.6738 | −0.4220 | 0.05 |
| 0.7453 | −0.4675 | 0.05 |
| 0.8144 | −0.5166 | 0.05 |
| 0.8810 | −0.5691 | 0.05 |
| 0.9450 | −0.6246 | 0.05 |
| 1.0066 | −0.6829 | 0.05 |
| 1.0656 | −0.7436 | 0.05 |
| 1.1223 | −0.8067 | 0.05 |
| 1.1766 | −0.8717 | 0.05 |
| 1.2287 | −0.9386 | 0.05 |
| 1.2787 | −1.0071 | 0.05 |
| 1.3272 | −1.0766 | 0.05 |
| 1.3746 | −1.1468 | 0.05 |
| 1.4284 | −1.2110 | 0.05 |
| 1.5101 | −1.2115 | 0.05 |
| 1.5576 | −1.1449 | 0.05 |
| 1.5383 | −1.0633 | 0.05 |
| 1.5074 | −0.9843 | 0.05 |
| 1.4748 | −0.9061 | 0.05 |
| 1.4417 | −0.8280 | 0.05 |
| 1.4085 | −0.7501 | 0.05 |
| 1.3750 | −0.6722 | 0.05 |
| 1.3414 | −0.5944 | 0.05 |
| 1.3074 | −0.5167 | 0.05 |
| 1.2731 | −0.4392 | 0.05 |
| 1.2383 | −0.3619 | 0.05 |
| 1.2030 | −0.2849 | 0.05 |
| 1.1671 | −0.2081 | 0.05 |
| 1.0930 | −0.0556 | 0.05 |
| 1.1305 | −0.1316 | 0.05 |
| 1.0547 | 0.0200 | 0.05 |
| 1.0154 | 0.0951 | 0.05 |
| 0.9747 | 0.1695 | 0.05 |
| 0.9324 | 0.2429 | 0.05 |
| 0.8884 | 0.3154 | 0.05 |
| 0.8423 | 0.3865 | 0.05 |
| 0.7935 | 0.4558 | 0.05 |
| 0.7415 | 0.5227 | 0.05 |
| 0.6860 | 0.5867 | 0.05 |
| 0.6266 | 0.6472 | 0.05 |
| 0.5633 | 0.7035 | 0.05 |
| 0.4959 | 0.7550 | 0.05 |
| 0.4248 | 0.8010 | 0.05 |
| 0.3501 | 0.8410 | 0.05 |
| 0.2723 | 0.8746 | 0.05 |
| 0.1920 | 0.9018 | 0.05 |
| 0.1098 | 0.9222 | 0.05 |
| 0.0261 | 0.9358 | 0.05 |
| −0.0583 | 0.9426 | 0.05 |
| −0.1431 | 0.9427 | 0.05 |
| −0.2276 | 0.9363 | 0.05 |
| −0.3113 | 0.9233 | 0.05 |
| −0.3938 | 0.9039 | 0.05 |
| −0.4746 | 0.8782 | 0.05 |
| −0.5531 | 0.8463 | 0.05 |
| −0.6290 | 0.8087 | 0.05 |
| −0.7021 | 0.7658 | 0.05 |
| −0.7721 | 0.7180 | 0.05 |
| −0.8390 | 0.6659 | 0.05 |
| −0.9027 | 0.6101 | 0.05 |
| −0.9634 | 0.5509 | 0.05 |
| −1.0211 | 0.4888 | 0.05 |
| −1.0761 | 0.4243 | 0.05 |
| −1.1285 | 0.3577 | 0.05 |
| −1.1785 | 0.2893 | 0.05 |
| −1.2260 | 0.2191 | 0.05 |
| −1.2708 | 0.1471 | 0.05 |
| −1.3123 | 0.0732 | 0.05 |
| −1.3505 | −0.0025 | 0.05 |
| −1.3853 | −0.0797 | 0.05 |
| −1.4161 | −0.1587 | 0.05 |
| −1.4419 | −0.2394 | 0.05 |
| −1.4602 | −0.3221 | 0.05 |
| −1.4647 | −0.4066 | 0.05 |
| −1.4348 | −0.4840 | 0.05 |
| −1.3488 | −0.4782 | 0.10 |
| −1.2655 | −0.4832 | 0.10 |
| −1.1852 | −0.4582 | 0.10 |
| −1.1085 | −0.4232 | 0.10 |
| −1.0323 | −0.3872 | 0.10 |
| −0.9553 | −0.3530 | 0.10 |
| −0.8769 | −0.3219 | 0.10 |
| −0.7974 | −0.2941 | 0.10 |
| −0.7168 | −0.2694 | 0.10 |
| −0.6356 | −0.2468 | 0.10 |
| −0.5538 | −0.2266 | 0.10 |
| −0.4713 | −0.2090 | 0.10 |
| −0.3883 | −0.1946 | 0.10 |
| −0.3047 | −0.1839 | 0.10 |
| −0.2207 | −0.1771 | 0.10 |
| −0.1364 | −0.1747 | 0.10 |
| −0.0522 | −0.1770 | 0.10 |
| 0.0318 | −0.1842 | 0.10 |
| 0.1151 | −0.1966 | 0.10 |
| 0.1976 | −0.2143 | 0.10 |
| 0.2787 | −0.2370 | 0.10 |
| 0.3583 | −0.2647 | 0.10 |
| 0.4360 | −0.2973 | 0.10 |
| 0.5117 | −0.3344 | 0.10 |
| 0.5852 | −0.3757 | 0.10 |
| 0.6563 | −0.4209 | 0.10 |
| 0.7250 | −0.4697 | 0.10 |
| 0.7913 | −0.5217 | 0.10 |
| 0.8552 | −0.5767 | 0.10 |
| 0.9167 | −0.6343 | 0.10 |
| 0.9759 | −0.6943 | 0.10 |
| 1.0329 | −0.7564 | 0.10 |
| 1.0877 | −0.8205 | 0.10 |
| 1.1404 | −0.8862 | 0.10 |
| 1.1912 | −0.9535 | 0.10 |
| 1.2402 | −1.0221 | 0.10 |
| 1.2880 | −1.0915 | 0.10 |
| 1.3356 | −1.1611 | 0.10 |
| 1.3903 | −1.2240 | 0.10 |
| 1.4715 | −1.2246 | 0.10 |
| 1.5193 | −1.1588 | 0.10 |
| 1.5020 | −1.0771 | 0.10 |
| 1.4727 | −0.9981 | 0.10 |
| 1.4409 | −0.9200 | 0.10 |
| 1.4085 | −0.8422 | 0.10 |
| 1.3760 | −0.7644 | 0.10 |
| 1.3434 | −0.6867 | 0.10 |
| 1.3105 | −0.6091 | 0.10 |
| 1.2775 | −0.5315 | 0.10 |
| 1.2441 | −0.4541 | 0.10 |
| 1.2103 | −0.3769 | 0.10 |
| 1.1760 | −0.2999 | 0.10 |
| 1.1412 | −0.2232 | 0.10 |
| 1.1057 | −0.1467 | 0.10 |
| 1.0695 | −0.0706 | 0.10 |
| 1.0324 | 0.0051 | 0.10 |
| 0.9944 | 0.0803 | 0.10 |
| 0.9550 | 0.1549 | 0.10 |
| 0.9141 | 0.2286 | 0.10 |
| 0.8715 | 0.3013 | 0.10 |
| 0.8268 | 0.3728 | 0.10 |
| 0.7795 | 0.4425 | 0.10 |
| 0.7291 | 0.5101 | 0.10 |
| 0.6755 | 0.5751 | 0.10 |

TABLE I-continued

| X Inches | Y Inches | Z % Span |
|---|---|---|
| 0.6183 | 0.6370 | 0.10 |
| 0.5575 | 0.6954 | 0.10 |
| 0.4930 | 0.7496 | 0.10 |
| 0.4248 | 0.7991 | 0.10 |
| 0.3530 | 0.8432 | 0.10 |
| 0.2779 | 0.8815 | 0.10 |
| 0.2000 | 0.9137 | 0.10 |
| 0.1198 | 0.9394 | 0.10 |
| 0.0376 | 0.9580 | 0.10 |
| −0.0459 | 0.9696 | 0.10 |
| −0.1300 | 0.9741 | 0.10 |
| −0.2142 | 0.9716 | 0.10 |
| −0.2980 | 0.9622 | 0.10 |
| −0.3806 | 0.9458 | 0.10 |
| −0.4617 | 0.9228 | 0.10 |
| −0.5406 | 0.8932 | 0.10 |
| −0.6170 | 0.8576 | 0.10 |
| −0.6904 | 0.8163 | 0.10 |
| −0.7607 | 0.7698 | 0.10 |
| −0.8278 | 0.7188 | 0.10 |
| −0.8915 | 0.6636 | 0.10 |
| −0.9519 | 0.6049 | 0.10 |
| −1.0092 | 0.5430 | 0.10 |
| −1.0635 | 0.4786 | 0.10 |
| −1.1150 | 0.4118 | 0.10 |
| −1.1638 | 0.3431 | 0.10 |
| −1.2101 | 0.2727 | 0.10 |
| −1.2538 | 0.2006 | 0.10 |
| −1.2940 | 0.1265 | 0.10 |
| −1.3305 | 0.0506 | 0.10 |
| −1.3636 | −0.0269 | 0.10 |
| −1.3928 | −0.1060 | 0.10 |
| −1.4171 | −0.1867 | 0.10 |
| −1.4344 | −0.2692 | 0.10 |
| −1.4398 | −0.3531 | 0.10 |
| −1.4182 | −0.4330 | 0.10 |
| −1.2786 | −0.4146 | 0.20 |
| −1.1966 | −0.4068 | 0.20 |
| −1.1203 | −0.3739 | 0.20 |
| −1.0475 | −0.3337 | 0.20 |
| −0.9748 | −0.2933 | 0.20 |
| −0.9008 | −0.2553 | 0.20 |
| −0.8252 | −0.2207 | 0.20 |
| −0.7479 | −0.1901 | 0.20 |
| −0.6692 | −0.1633 | 0.20 |
| −0.5894 | −0.1400 | 0.20 |
| −0.5087 | −0.1199 | 0.20 |
| −0.4271 | −0.1036 | 0.20 |
| −0.3448 | −0.0919 | 0.20 |
| −0.2619 | −0.0852 | 0.20 |
| −0.1788 | −0.0840 | 0.20 |
| −0.0958 | −0.0887 | 0.20 |
| −0.0133 | −0.0994 | 0.20 |
| 0.0682 | −0.1161 | 0.20 |
| 0.1482 | −0.1387 | 0.20 |
| 0.2264 | −0.1668 | 0.20 |
| 0.3026 | −0.2001 | 0.20 |
| 0.3766 | −0.2380 | 0.20 |
| 0.4483 | −0.2801 | 0.20 |
| 0.5176 | −0.3262 | 0.20 |
| 0.5844 | −0.3757 | 0.20 |
| 0.6488 | −0.4282 | 0.20 |
| 0.7110 | −0.4834 | 0.20 |
| 0.7710 | −0.5411 | 0.20 |
| 0.8288 | −0.6008 | 0.20 |
| 0.8847 | −0.6624 | 0.20 |
| 0.9386 | −0.7257 | 0.20 |
| 0.9908 | −0.7905 | 0.20 |
| 1.0413 | −0.8565 | 0.20 |
| 1.0903 | −0.9237 | 0.20 |
| 1.1378 | −0.9920 | 0.20 |
| 1.1839 | −1.0612 | 0.20 |
| 1.2291 | −1.1310 | 0.20 |
| 1.2754 | −1.2001 | 0.20 |
| 1.3309 | −1.2610 | 0.20 |
| 1.4112 | −1.2619 | 0.20 |

TABLE I-continued

| X Inches | Y Inches | Z % Span |
|---|---|---|
| 1.4594 | −1.1977 | 0.20 |
| 1.4454 | −1.1164 | 0.20 |
| 1.4178 | −1.0380 | 0.20 |
| 1.3872 | −0.9606 | 0.20 |
| 1.3558 | −0.8836 | 0.20 |
| 1.3241 | −0.8067 | 0.20 |
| 1.2924 | −0.7299 | 0.20 |
| 1.2604 | −0.6531 | 0.20 |
| 1.2282 | −0.5764 | 0.20 |
| 1.1956 | −0.4999 | 0.20 |
| 1.1626 | −0.4235 | 0.20 |
| 1.1292 | −0.3474 | 0.20 |
| 1.0953 | −0.2715 | 0.20 |
| 1.0607 | −0.1958 | 0.20 |
| 1.0255 | −0.1205 | 0.20 |
| 0.9895 | −0.0455 | 0.20 |
| 0.9526 | 0.0290 | 0.20 |
| 0.9145 | 0.1030 | 0.20 |
| 0.8752 | 0.1762 | 0.20 |
| 0.8344 | 0.2487 | 0.20 |
| 0.7918 | 0.3201 | 0.20 |
| 0.7471 | 0.3902 | 0.20 |
| 0.6998 | 0.4587 | 0.20 |
| 0.6499 | 0.5251 | 0.20 |
| 0.5970 | 0.5894 | 0.20 |
| 0.5410 | 0.6508 | 0.20 |
| 0.4815 | 0.7089 | 0.20 |
| 0.4184 | 0.7630 | 0.20 |
| 0.3517 | 0.8126 | 0.20 |
| 0.2815 | 0.8572 | 0.20 |
| 0.2080 | 0.8962 | 0.20 |
| 0.1315 | 0.9287 | 0.20 |
| 0.0524 | 0.9543 | 0.20 |
| −0.0287 | 0.9724 | 0.20 |
| −0.1112 | 0.9830 | 0.20 |
| −0.1943 | 0.9861 | 0.20 |
| −0.2773 | 0.9817 | 0.20 |
| −0.3596 | 0.9700 | 0.20 |
| −0.4406 | 0.9513 | 0.20 |
| −0.5197 | 0.9257 | 0.20 |
| −0.5964 | 0.8937 | 0.20 |
| −0.6703 | 0.8556 | 0.20 |
| −0.7410 | 0.8118 | 0.20 |
| −0.8082 | 0.7629 | 0.20 |
| −0.8719 | 0.7094 | 0.20 |
| −0.9319 | 0.6518 | 0.20 |
| −0.9883 | 0.5907 | 0.20 |
| −1.0414 | 0.5267 | 0.20 |
| −1.0912 | 0.4601 | 0.20 |
| −1.1380 | 0.3914 | 0.20 |
| −1.1822 | 0.3210 | 0.20 |
| −1.2235 | 0.2488 | 0.20 |
| −1.2609 | 0.1745 | 0.20 |
| −1.2944 | 0.0984 | 0.20 |
| −1.3242 | 0.0208 | 0.20 |
| −1.3498 | −0.0584 | 0.20 |
| −1.3702 | −0.1390 | 0.20 |
| −1.3830 | −0.2211 | 0.20 |
| −1.3829 | −0.3041 | 0.20 |
| −1.3527 | −0.3803 | 0.20 |
| −1.2750 | −0.3356 | 0.30 |
| −1.1951 | −0.3497 | 0.30 |
| −1.1168 | −0.3255 | 0.30 |
| −1.0448 | −0.2858 | 0.30 |
| −0.9748 | −0.2427 | 0.30 |
| −0.9043 | −0.2004 | 0.30 |
| −0.8322 | −0.1608 | 0.30 |
| −0.7582 | −0.1249 | 0.30 |
| −0.6823 | −0.0932 | 0.30 |
| −0.6048 | −0.0657 | 0.30 |
| −0.5260 | −0.0423 | 0.30 |
| −0.4459 | −0.0233 | 0.30 |
| −0.3648 | −0.0097 | 0.30 |
| −0.2830 | −0.0020 | 0.30 |
| −0.2007 | −0.0011 | 0.30 |
| −0.1187 | −0.0072 | 0.30 |

TABLE I-continued

| X Inches | Y Inches | Z % Span |
|---|---|---|
| −0.0376 | −0.0205 | 0.30 |
| 0.0421 | −0.0409 | 0.30 |
| 0.1197 | −0.0679 | 0.30 |
| 0.1950 | −0.1009 | 0.30 |
| 0.2677 | −0.1394 | 0.30 |
| 0.3377 | −0.1826 | 0.30 |
| 0.4051 | −0.2297 | 0.30 |
| 0.4699 | −0.2804 | 0.30 |
| 0.5322 | −0.3341 | 0.30 |
| 0.5922 | −0.3904 | 0.30 |
| 0.6499 | −0.4489 | 0.30 |
| 0.7057 | −0.5094 | 0.30 |
| 0.7596 | −0.5715 | 0.30 |
| 0.8118 | −0.6351 | 0.30 |
| 0.8624 | −0.6999 | 0.30 |
| 0.9115 | −0.7659 | 0.30 |
| 0.9593 | −0.8328 | 0.30 |
| 1.0059 | −0.9006 | 0.30 |
| 1.0514 | −0.9691 | 0.30 |
| 1.0957 | −1.0384 | 0.30 |
| 1.1392 | −1.1083 | 0.30 |
| 1.1826 | −1.1781 | 0.30 |
| 1.2273 | −1.2472 | 0.30 |
| 1.2810 | −1.3082 | 0.30 |
| 1.3604 | −1.3096 | 0.30 |
| 1.4090 | −1.2467 | 0.30 |
| 1.3961 | −1.1662 | 0.30 |
| 1.3700 | −1.0882 | 0.30 |
| 1.3402 | −1.0115 | 0.30 |
| 1.3094 | −0.9352 | 0.30 |
| 1.2784 | −0.8591 | 0.30 |
| 1.2472 | −0.7830 | 0.30 |
| 1.2157 | −0.7070 | 0.30 |
| 1.1840 | −0.6311 | 0.30 |
| 1.1518 | −0.5554 | 0.30 |
| 1.1193 | −0.4798 | 0.30 |
| 1.0864 | −0.4044 | 0.30 |
| 1.0530 | −0.3293 | 0.30 |
| 1.0190 | −0.2544 | 0.30 |
| 0.9844 | −0.1798 | 0.30 |
| 0.9491 | −0.1055 | 0.30 |
| 0.9130 | −0.0316 | 0.30 |
| 0.8759 | 0.0419 | 0.30 |
| 0.7986 | 0.1871 | 0.30 |
| 0.8378 | 0.1148 | 0.30 |
| 0.7580 | 0.2586 | 0.30 |
| 0.7157 | 0.3291 | 0.30 |
| 0.6715 | 0.3985 | 0.30 |
| 0.6251 | 0.4664 | 0.30 |
| 0.5762 | 0.5325 | 0.30 |
| 0.5245 | 0.5965 | 0.30 |
| 0.4696 | 0.6578 | 0.30 |
| 0.4113 | 0.7157 | 0.30 |
| 0.3493 | 0.7698 | 0.30 |
| 0.2838 | 0.8195 | 0.30 |
| 0.2147 | 0.8641 | 0.30 |
| 0.1422 | 0.9028 | 0.30 |
| 0.0664 | 0.9347 | 0.30 |
| −0.0121 | 0.9592 | 0.30 |
| −0.0925 | 0.9762 | 0.30 |
| −0.1742 | 0.9854 | 0.30 |
| −0.2564 | 0.9868 | 0.30 |
| −0.3384 | 0.9803 | 0.30 |
| −0.4194 | 0.9663 | 0.30 |
| −0.4988 | 0.9448 | 0.30 |
| −0.5759 | 0.9162 | 0.30 |
| −0.6501 | 0.8808 | 0.30 |
| −0.7209 | 0.8390 | 0.30 |
| −0.7880 | 0.7915 | 0.30 |
| −0.8512 | 0.7389 | 0.30 |
| −0.9105 | 0.6818 | 0.30 |
| −0.9658 | 0.6210 | 0.30 |
| −1.0175 | 0.5570 | 0.30 |
| −1.0657 | 0.4903 | 0.30 |
| −1.1107 | 0.4215 | 0.30 |
| −1.1531 | 0.3511 | 0.30 |

TABLE I-continued

| X Inches | Y Inches | Z % Span |
|---|---|---|
| −1.1922 | 0.2787 | 0.30 |
| −1.2272 | 0.2043 | 0.30 |
| −1.2583 | 0.1282 | 0.30 |
| −1.2855 | 0.0505 | 0.30 |
| −1.3081 | −0.0285 | 0.30 |
| −1.3249 | −0.1090 | 0.30 |
| −1.3326 | −0.1909 | 0.30 |
| −1.3236 | −0.2723 | 0.30 |
| −1.2050 | −0.2886 | 0.40 |
| −1.1248 | −0.2873 | 0.40 |
| −1.0503 | −0.2554 | 0.40 |
| −0.9807 | −0.2135 | 0.40 |
| −0.9123 | −0.1698 | 0.40 |
| −0.8431 | −0.1272 | 0.40 |
| −0.7723 | −0.0874 | 0.40 |
| −0.6996 | −0.0513 | 0.40 |
| −0.6250 | −0.0192 | 0.40 |
| −0.5486 | 0.0085 | 0.40 |
| −0.4707 | 0.0314 | 0.40 |
| −0.3913 | 0.0484 | 0.40 |
| −0.3108 | 0.0585 | 0.40 |
| −0.2296 | 0.0608 | 0.40 |
| −0.1486 | 0.0548 | 0.40 |
| −0.0688 | 0.0403 | 0.40 |
| 0.0093 | 0.0178 | 0.40 |
| 0.0848 | −0.0119 | 0.40 |
| 0.1575 | −0.0481 | 0.40 |
| 0.2271 | −0.0899 | 0.40 |
| 0.2937 | −0.1364 | 0.40 |
| 0.3574 | −0.1867 | 0.40 |
| 0.4185 | −0.2403 | 0.40 |
| 0.4770 | −0.2966 | 0.40 |
| 0.5332 | −0.3552 | 0.40 |
| 0.5873 | −0.4158 | 0.40 |
| 0.6396 | −0.4779 | 0.40 |
| 0.6902 | −0.5415 | 0.40 |
| 0.7393 | −0.6062 | 0.40 |
| 0.7870 | −0.6719 | 0.40 |
| 0.8334 | −0.7386 | 0.40 |
| 0.8788 | −0.8060 | 0.40 |
| 0.9231 | −0.8740 | 0.40 |
| 0.9665 | −0.9427 | 0.40 |
| 1.0091 | −1.0118 | 0.40 |
| 1.0510 | −1.0814 | 0.40 |
| 1.0921 | −1.1514 | 0.40 |
| 1.1335 | −1.2213 | 0.40 |
| 1.1765 | −1.2902 | 0.40 |
| 1.2295 | −1.3506 | 0.40 |
| 1.3079 | −1.3522 | 0.40 |
| 1.3566 | −1.2906 | 0.40 |
| 1.3452 | −1.2109 | 0.40 |
| 1.3202 | −1.1336 | 0.40 |
| 1.2913 | −1.0577 | 0.40 |
| 1.2613 | −0.9822 | 0.40 |
| 1.2310 | −0.9069 | 0.40 |
| 1.2006 | −0.8316 | 0.40 |
| 1.1699 | −0.7564 | 0.40 |
| 1.1389 | −0.6813 | 0.40 |
| 1.1075 | −0.6064 | 0.40 |
| 1.0758 | −0.5316 | 0.40 |
| 1.0437 | −0.4570 | 0.40 |
| 1.0111 | −0.3826 | 0.40 |
| 0.9781 | −0.3084 | 0.40 |
| 0.9444 | −0.2345 | 0.40 |
| 0.9101 | −0.1608 | 0.40 |
| 0.8752 | −0.0875 | 0.40 |
| 0.8394 | −0.0146 | 0.40 |
| 0.8028 | 0.0579 | 0.40 |
| 0.7653 | 0.1299 | 0.40 |
| 0.7266 | 0.2014 | 0.40 |
| 0.6866 | 0.2720 | 0.40 |
| 0.6450 | 0.3418 | 0.40 |
| 0.6016 | 0.4105 | 0.40 |
| 0.5562 | 0.4778 | 0.40 |
| 0.5084 | 0.5434 | 0.40 |
| 0.4576 | 0.6068 | 0.40 |

TABLE I-continued

| X Inches | Y Inches | Z % Span |
|---|---|---|
| 0.4037 | 0.6676 | 0.40 |
| 0.3465 | 0.7252 | 0.40 |
| 0.2858 | 0.7792 | 0.40 |
| 0.2216 | 0.8289 | 0.40 |
| 0.1537 | 0.8735 | 0.40 |
| 0.0822 | 0.9119 | 0.40 |
| 0.0075 | 0.9436 | 0.40 |
| −0.0700 | 0.9680 | 0.40 |
| −0.1495 | 0.9844 | 0.40 |
| −0.2303 | 0.9924 | 0.40 |
| −0.3115 | 0.9918 | 0.40 |
| −0.3921 | 0.9825 | 0.40 |
| −0.4713 | 0.9645 | 0.40 |
| −0.5481 | 0.9382 | 0.40 |
| −0.6217 | 0.9041 | 0.40 |
| −0.6917 | 0.8629 | 0.40 |
| −0.7577 | 0.8156 | 0.40 |
| −0.8195 | 0.7629 | 0.40 |
| −0.8772 | 0.7057 | 0.40 |
| −0.9309 | 0.6448 | 0.40 |
| −0.9809 | 0.5809 | 0.40 |
| −1.0276 | 0.5144 | 0.40 |
| −1.0713 | 0.4459 | 0.40 |
| −1.1124 | 0.3759 | 0.40 |
| −1.1503 | 0.3041 | 0.40 |
| −1.1845 | 0.2304 | 0.40 |
| −1.2149 | 0.1551 | 0.40 |
| −1.2413 | 0.0783 | 0.40 |
| −1.2629 | 0.0000 | 0.40 |
| −1.2782 | −0.0797 | 0.40 |
| −1.2830 | −0.1607 | 0.40 |
| −1.2663 | −0.2396 | 0.40 |
| −1.2115 | −0.2017 | 0.50 |
| −1.1425 | −0.2377 | 0.50 |
| −1.0641 | −0.2257 | 0.50 |
| −0.9921 | −0.1906 | 0.50 |
| −0.9239 | −0.1487 | 0.50 |
| −0.8562 | −0.1058 | 0.50 |
| −0.7877 | −0.0642 | 0.50 |
| −0.7176 | −0.0254 | 0.50 |
| −0.6456 | 0.0098 | 0.50 |
| −0.5718 | 0.0409 | 0.50 |
| −0.4962 | 0.0674 | 0.50 |
| −0.4188 | 0.0880 | 0.50 |
| −0.3398 | 0.1013 | 0.50 |
| −0.2599 | 0.1061 | 0.50 |
| −0.1800 | 0.1014 | 0.50 |
| −0.1012 | 0.0871 | 0.50 |
| −0.0246 | 0.0636 | 0.50 |
| 0.0490 | 0.0321 | 0.50 |
| 0.1193 | −0.0063 | 0.50 |
| 0.1862 | −0.0505 | 0.50 |
| 0.2497 | −0.0992 | 0.50 |
| 0.3102 | −0.1518 | 0.50 |
| 0.3679 | −0.2074 | 0.50 |
| 0.4231 | −0.2654 | 0.50 |
| 0.4761 | −0.3255 | 0.50 |
| 0.5271 | −0.3873 | 0.50 |
| 0.5764 | −0.4505 | 0.50 |
| 0.6241 | −0.5149 | 0.50 |
| 0.6704 | −0.5803 | 0.50 |
| 0.7155 | −0.6465 | 0.50 |
| 0.7595 | −0.7135 | 0.50 |
| 0.8025 | −0.7811 | 0.50 |
| 0.8446 | −0.8492 | 0.50 |
| 0.8860 | −0.9178 | 0.50 |
| 0.9267 | −0.9868 | 0.50 |
| 0.9669 | −1.0562 | 0.50 |
| 1.0065 | −1.1258 | 0.50 |
| 1.0456 | −1.1958 | 0.50 |
| 1.0851 | −1.2655 | 0.50 |
| 1.1263 | −1.3342 | 0.50 |
| 1.1782 | −1.3939 | 0.50 |
| 1.2556 | −1.3956 | 0.50 |
| 1.3044 | −1.3354 | 0.50 |
| 1.2942 | −1.2566 | 0.50 |
| 1.2701 | −1.1802 | 0.50 |
| 1.2424 | −1.1050 | 0.50 |
| 1.2133 | −1.0304 | 0.50 |
| 1.1840 | −0.9558 | 0.50 |
| 1.1546 | −0.8813 | 0.50 |
| 1.1249 | −0.8069 | 0.50 |
| 1.0950 | −0.7325 | 0.50 |
| 1.0647 | −0.6583 | 0.50 |
| 1.0341 | −0.5843 | 0.50 |
| 1.0032 | −0.5104 | 0.50 |
| 0.9718 | −0.4366 | 0.50 |
| 0.9400 | −0.3631 | 0.50 |
| 0.9077 | −0.2898 | 0.50 |
| 0.8748 | −0.2167 | 0.50 |
| 0.8413 | −0.1439 | 0.50 |
| 0.8072 | −0.0714 | 0.50 |
| 0.7723 | 0.0007 | 0.50 |
| 0.7365 | 0.0724 | 0.50 |
| 0.6998 | 0.1436 | 0.50 |
| 0.6619 | 0.2142 | 0.50 |
| 0.6227 | 0.2841 | 0.50 |
| 0.5821 | 0.3531 | 0.50 |
| 0.5397 | 0.4212 | 0.50 |
| 0.4954 | 0.4879 | 0.50 |
| 0.4485 | 0.5529 | 0.50 |
| 0.3989 | 0.6158 | 0.50 |
| 0.3464 | 0.6763 | 0.50 |
| 0.2908 | 0.7340 | 0.50 |
| 0.2318 | 0.7882 | 0.50 |
| 0.1692 | 0.8382 | 0.50 |
| 0.1028 | 0.8830 | 0.50 |
| 0.0328 | 0.9218 | 0.50 |
| −0.0407 | 0.9537 | 0.50 |
| −0.1171 | 0.9777 | 0.50 |
| −0.1958 | 0.9928 | 0.50 |
| −0.2757 | 0.9985 | 0.50 |
| −0.3556 | 0.9943 | 0.50 |
| −0.4344 | 0.9801 | 0.50 |
| −0.5109 | 0.9564 | 0.50 |
| −0.5842 | 0.9240 | 0.50 |
| −0.6535 | 0.8839 | 0.50 |
| −0.7186 | 0.8372 | 0.50 |
| −0.7794 | 0.7850 | 0.50 |
| −0.8360 | 0.7284 | 0.50 |
| −0.8887 | 0.6680 | 0.50 |
| −0.9378 | 0.6047 | 0.50 |
| −0.9836 | 0.5390 | 0.50 |
| −1.0265 | 0.4713 | 0.50 |
| −1.0670 | 0.4022 | 0.50 |
| −1.1046 | 0.3314 | 0.50 |
| −1.1389 | 0.2590 | 0.50 |
| −1.1695 | 0.1850 | 0.50 |
| −1.1961 | 0.1094 | 0.50 |
| −1.2178 | 0.0323 | 0.50 |
| −1.2325 | −0.0464 | 0.50 |
| −1.2355 | −0.1264 | 0.50 |
| −1.1511 | −0.1583 | 0.60 |
| −1.0760 | −0.1775 | 0.60 |
| −1.0003 | −0.1557 | 0.60 |
| −0.9305 | −0.1185 | 0.60 |
| −0.8631 | −0.0771 | 0.60 |
| −0.7956 | −0.0358 | 0.60 |
| −0.7269 | 0.0035 | 0.60 |
| −0.6565 | 0.0395 | 0.60 |
| −0.5841 | 0.0715 | 0.60 |
| −0.5099 | 0.0990 | 0.60 |
| −0.4339 | 0.1208 | 0.60 |
| −0.3562 | 0.1355 | 0.60 |
| −0.2773 | 0.1413 | 0.60 |
| −0.1983 | 0.1372 | 0.60 |
| −0.1206 | 0.1228 | 0.60 |
| −0.0453 | 0.0985 | 0.60 |
| 0.0266 | 0.0655 | 0.60 |
| 0.0947 | 0.0254 | 0.60 |
| 0.1591 | −0.0206 | 0.60 |
| 0.2199 | −0.0712 | 0.60 |

TABLE I-continued

| X Inches | Y Inches | Z % Span |
|---|---|---|
| 0.2775 | −0.1255 | 0.60 |
| 0.3321 | −0.1827 | 0.60 |
| 0.3843 | −0.2422 | 0.60 |
| 0.4343 | −0.3036 | 0.60 |
| 0.4823 | −0.3665 | 0.60 |
| 0.5285 | −0.4307 | 0.60 |
| 0.5733 | −0.4959 | 0.60 |
| 0.6168 | −0.5620 | 0.60 |
| 0.6591 | −0.6289 | 0.60 |
| 0.7004 | −0.6964 | 0.60 |
| 0.7408 | −0.7644 | 0.60 |
| 0.7804 | −0.8329 | 0.60 |
| 0.8193 | −0.9018 | 0.60 |
| 0.8577 | −0.9710 | 0.60 |
| 0.8956 | −1.0405 | 0.60 |
| 0.9330 | −1.1102 | 0.60 |
| 0.9701 | −1.1801 | 0.60 |
| 1.0069 | −1.2502 | 0.60 |
| 1.0442 | −1.3200 | 0.60 |
| 1.0832 | −1.3888 | 0.60 |
| 1.1330 | −1.4488 | 0.60 |
| 1.2095 | −1.4510 | 0.60 |
| 1.2585 | −1.3921 | 0.60 |
| 1.2494 | −1.3143 | 0.60 |
| 1.2258 | −1.2388 | 0.60 |
| 1.1991 | −1.1643 | 0.60 |
| 1.1711 | −1.0903 | 0.60 |
| 1.1430 | −1.0163 | 0.60 |
| 1.1146 | −0.9424 | 0.60 |
| 1.0861 | −0.8686 | 0.60 |
| 1.0573 | −0.7949 | 0.60 |
| 1.0283 | −0.7213 | 0.60 |
| 0.9990 | −0.6478 | 0.60 |
| 0.9693 | −0.5744 | 0.60 |
| 0.9393 | −0.5012 | 0.60 |
| 0.9089 | −0.4282 | 0.60 |
| 0.8780 | −0.3553 | 0.60 |
| 0.8467 | −0.2826 | 0.60 |
| 0.8147 | −0.2102 | 0.60 |
| 0.7822 | −0.1381 | 0.60 |
| 0.7491 | −0.0663 | 0.60 |
| 0.7152 | 0.0053 | 0.60 |
| 0.6804 | 0.0764 | 0.60 |
| 0.6447 | 0.1470 | 0.60 |
| 0.6078 | 0.2170 | 0.60 |
| 0.5698 | 0.2864 | 0.60 |
| 0.5304 | 0.3550 | 0.60 |
| 0.4892 | 0.4226 | 0.60 |
| 0.4461 | 0.4889 | 0.60 |
| 0.4006 | 0.5536 | 0.60 |
| 0.3525 | 0.6165 | 0.60 |
| 0.3017 | 0.6771 | 0.60 |
| 0.2478 | 0.7351 | 0.60 |
| 0.1904 | 0.7895 | 0.60 |
| 0.1292 | 0.8396 | 0.60 |
| 0.0640 | 0.8845 | 0.60 |
| −0.0050 | 0.9231 | 0.60 |
| −0.0777 | 0.9541 | 0.60 |
| −0.1536 | 0.9766 | 0.60 |
| −0.2316 | 0.9893 | 0.60 |
| −0.3107 | 0.9917 | 0.60 |
| −0.3893 | 0.9834 | 0.60 |
| −0.4662 | 0.9649 | 0.60 |
| −0.5401 | 0.9368 | 0.60 |
| −0.6103 | 0.9003 | 0.60 |
| −0.6762 | 0.8566 | 0.60 |
| −0.7377 | 0.8069 | 0.60 |
| −0.7948 | 0.7522 | 0.60 |
| −0.8479 | 0.6934 | 0.60 |
| −0.8971 | 0.6315 | 0.60 |
| −0.9429 | 0.5670 | 0.60 |
| −0.9857 | 0.5004 | 0.60 |
| −1.0257 | 0.4322 | 0.60 |
| −1.0630 | 0.3624 | 0.60 |
| −1.0971 | 0.2910 | 0.60 |
| −1.1275 | 0.2179 | 0.60 |

TABLE I-continued

| X Inches | Y Inches | Z % Span |
|---|---|---|
| −1.1537 | 0.1433 | 0.60 |
| −1.1748 | 0.0670 | 0.60 |
| −1.1880 | −0.0109 | 0.60 |
| −1.1870 | −0.0898 | 0.60 |
| −1.0894 | −0.1069 | 0.70 |
| −1.0127 | −0.1117 | 0.70 |
| −0.9399 | −0.0839 | 0.70 |
| −0.8715 | −0.0461 | 0.70 |
| −0.8044 | −0.0061 | 0.70 |
| −0.7366 | 0.0327 | 0.70 |
| −0.6672 | 0.0686 | 0.70 |
| −0.5958 | 0.1003 | 0.70 |
| −0.5225 | 0.1273 | 0.70 |
| −0.4473 | 0.1486 | 0.70 |
| −0.3705 | 0.1628 | 0.70 |
| −0.2926 | 0.1682 | 0.70 |
| −0.2147 | 0.1635 | 0.70 |
| −0.1382 | 0.1481 | 0.70 |
| −0.0644 | 0.1226 | 0.70 |
| 0.0058 | 0.0882 | 0.70 |
| 0.0718 | 0.0466 | 0.70 |
| 0.1339 | −0.0008 | 0.70 |
| 0.1923 | −0.0527 | 0.70 |
| 0.2473 | −0.1082 | 0.70 |
| 0.2994 | −0.1665 | 0.70 |
| 0.3489 | −0.2270 | 0.70 |
| 0.3961 | −0.2892 | 0.70 |
| 0.4415 | −0.3528 | 0.70 |
| 0.4851 | −0.4176 | 0.70 |
| 0.5273 | −0.4834 | 0.70 |
| 0.5681 | −0.5500 | 0.70 |
| 0.6079 | −0.6172 | 0.70 |
| 0.6467 | −0.6851 | 0.70 |
| 0.6846 | −0.7534 | 0.70 |
| 0.7218 | −0.8221 | 0.70 |
| 0.7584 | −0.8911 | 0.70 |
| 0.7945 | −0.9605 | 0.70 |
| 0.8301 | −1.0300 | 0.70 |
| 0.8654 | −1.0997 | 0.70 |
| 0.9003 | −1.1696 | 0.70 |
| 0.9351 | −1.2396 | 0.70 |
| 0.9698 | −1.3096 | 0.70 |
| 1.0050 | −1.3794 | 0.70 |
| 1.0415 | −1.4484 | 0.70 |
| 1.0900 | −1.5081 | 0.70 |
| 1.1654 | −1.5109 | 0.70 |
| 1.2142 | −1.4531 | 0.70 |
| 1.2060 | −1.3763 | 0.70 |
| 1.1831 | −1.3016 | 0.70 |
| 1.1573 | −1.2278 | 0.70 |
| 1.1305 | −1.1544 | 0.70 |
| 1.1036 | −1.0811 | 0.70 |
| 1.0765 | −1.0078 | 0.70 |
| 1.0492 | −0.9346 | 0.70 |
| 1.0217 | −0.8615 | 0.70 |
| 0.9939 | −0.7884 | 0.70 |
| 0.9659 | −0.7155 | 0.70 |
| 0.9377 | −0.6426 | 0.70 |
| 0.9090 | −0.5699 | 0.70 |
| 0.8801 | −0.4974 | 0.70 |
| 0.8507 | −0.4250 | 0.70 |
| 0.8209 | −0.3527 | 0.70 |
| 0.7906 | −0.2807 | 0.70 |
| 0.7598 | −0.2089 | 0.70 |
| 0.7284 | −0.1373 | 0.70 |
| 0.6964 | −0.0661 | 0.70 |
| 0.6636 | 0.0049 | 0.70 |
| 0.6300 | 0.0754 | 0.70 |
| 0.5955 | 0.1455 | 0.70 |
| 0.5600 | 0.2151 | 0.70 |
| 0.5233 | 0.2841 | 0.70 |
| 0.4852 | 0.3523 | 0.70 |
| 0.4455 | 0.4196 | 0.70 |
| 0.4038 | 0.4857 | 0.70 |
| 0.3599 | 0.5503 | 0.70 |
| 0.3137 | 0.6133 | 0.70 |

TABLE I-continued

| X Inches | Y Inches | Z % Span |
|---|---|---|
| 0.2646 | 0.6741 | 0.70 |
| 0.2122 | 0.7321 | 0.70 |
| 0.1562 | 0.7865 | 0.70 |
| 0.0962 | 0.8366 | 0.70 |
| 0.0321 | 0.8812 | 0.70 |
| -0.0362 | 0.9191 | 0.70 |
| -0.1083 | 0.9490 | 0.70 |
| -0.1836 | 0.9696 | 0.70 |
| -0.2610 | 0.9799 | 0.70 |
| -0.3391 | 0.9793 | 0.70 |
| -0.4163 | 0.9679 | 0.70 |
| -0.4913 | 0.9462 | 0.70 |
| -0.5630 | 0.9152 | 0.70 |
| -0.6306 | 0.8760 | 0.70 |
| -0.6936 | 0.8300 | 0.70 |
| -0.7521 | 0.7782 | 0.70 |
| -0.8062 | 0.7218 | 0.70 |
| -0.8562 | 0.6618 | 0.70 |
| -0.9024 | 0.5988 | 0.70 |
| -0.9452 | 0.5334 | 0.70 |
| -0.9849 | 0.4661 | 0.70 |
| -1.0219 | 0.3973 | 0.70 |
| -1.0558 | 0.3269 | 0.70 |
| -1.0859 | 0.2548 | 0.70 |
| -1.1117 | 0.1811 | 0.70 |
| -1.1320 | 0.1057 | 0.70 |
| -1.1435 | 0.0284 | 0.70 |
| -1.1377 | -0.0491 | 0.70 |
| -1.0375 | -0.0483 | 0.80 |
| -0.9616 | -0.0453 | 0.80 |
| -0.8907 | -0.0156 | 0.80 |
| -0.8232 | 0.0215 | 0.80 |
| -0.7561 | 0.0594 | 0.80 |
| -0.6878 | 0.0950 | 0.80 |
| -0.6176 | 0.1266 | 0.80 |
| -0.5452 | 0.1531 | 0.80 |
| -0.4710 | 0.1735 | 0.80 |
| -0.3951 | 0.1866 | 0.80 |
| -0.3183 | 0.1906 | 0.80 |
| -0.2416 | 0.1842 | 0.80 |
| -0.1666 | 0.1671 | 0.80 |
| -0.0946 | 0.1398 | 0.80 |
| -0.0265 | 0.1038 | 0.80 |
| 0.0372 | 0.0606 | 0.80 |
| 0.0969 | 0.0119 | 0.80 |
| 0.1527 | -0.0411 | 0.80 |
| 0.2053 | -0.0974 | 0.80 |
| 0.2550 | -0.1563 | 0.80 |
| 0.3021 | -0.2172 | 0.80 |
| 0.3471 | -0.2797 | 0.80 |
| 0.3903 | -0.3435 | 0.80 |
| 0.4318 | -0.4083 | 0.80 |
| 0.4719 | -0.4741 | 0.80 |
| 0.5108 | -0.5406 | 0.80 |
| 0.5487 | -0.6076 | 0.80 |
| 0.5856 | -0.6752 | 0.80 |
| 0.6218 | -0.7432 | 0.80 |
| 0.6573 | -0.8116 | 0.80 |
| 0.6922 | -0.8803 | 0.80 |
| 0.7266 | -0.9492 | 0.80 |
| 0.7606 | -1.0183 | 0.80 |
| 0.7944 | -1.0875 | 0.80 |
| 0.8279 | -1.1569 | 0.80 |
| 0.8612 | -1.2263 | 0.80 |
| 0.8944 | -1.2958 | 0.80 |
| 0.9277 | -1.3653 | 0.80 |
| 0.9615 | -1.4345 | 0.80 |
| 0.9966 | -1.5030 | 0.80 |
| 1.0441 | -1.5620 | 0.80 |
| 1.1186 | -1.5651 | 0.80 |
| 1.1664 | -1.5079 | 0.80 |
| 1.1602 | -1.4322 | 0.80 |
| 1.1374 | -1.3586 | 0.80 |
| 1.1126 | -1.2857 | 0.80 |
| 1.0870 | -1.2131 | 0.80 |
| 1.0612 | -1.1405 | 0.80 |

TABLE I-continued

| X Inches | Y Inches | Z % Span |
|---|---|---|
| 1.0354 | -1.0679 | 0.80 |
| 1.0093 | -0.9954 | 0.80 |
| 0.9831 | -0.9230 | 0.80 |
| 0.9567 | -0.8507 | 0.80 |
| 0.9301 | -0.7784 | 0.80 |
| 0.9032 | -0.7062 | 0.80 |
| 0.8760 | -0.6341 | 0.80 |
| 0.8485 | -0.5622 | 0.80 |
| 0.8206 | -0.4904 | 0.80 |
| 0.7924 | -0.4187 | 0.80 |
| 0.7638 | -0.3472 | 0.80 |
| 0.7346 | -0.2759 | 0.80 |
| 0.7051 | -0.2048 | 0.80 |
| 0.6749 | -0.1339 | 0.80 |
| 0.6442 | -0.0633 | 0.80 |
| 0.6127 | 0.0070 | 0.80 |
| 0.5805 | 0.0770 | 0.80 |
| 0.5474 | 0.1466 | 0.80 |
| 0.5133 | 0.2157 | 0.80 |
| 0.4782 | 0.2842 | 0.80 |
| 0.4416 | 0.3520 | 0.80 |
| 0.4035 | 0.4189 | 0.80 |
| 0.3636 | 0.4848 | 0.80 |
| 0.3217 | 0.5494 | 0.80 |
| 0.2773 | 0.6124 | 0.80 |
| 0.2301 | 0.6732 | 0.80 |
| 0.1796 | 0.7313 | 0.80 |
| 0.1252 | 0.7859 | 0.80 |
| 0.0668 | 0.8361 | 0.80 |
| 0.0040 | 0.8806 | 0.80 |
| -0.0632 | 0.9182 | 0.80 |
| -0.1344 | 0.9474 | 0.80 |
| -0.2089 | 0.9667 | 0.80 |
| -0.2854 | 0.9751 | 0.80 |
| -0.3623 | 0.9723 | 0.80 |
| -0.4380 | 0.9583 | 0.80 |
| -0.5110 | 0.9339 | 0.80 |
| -0.5803 | 0.9004 | 0.80 |
| -0.6452 | 0.8589 | 0.80 |
| -0.7053 | 0.8109 | 0.80 |
| -0.7608 | 0.7575 | 0.80 |
| -0.8117 | 0.6997 | 0.80 |
| -0.8586 | 0.6386 | 0.80 |
| -0.9016 | 0.5747 | 0.80 |
| -0.9413 | 0.5087 | 0.80 |
| -0.9782 | 0.4411 | 0.80 |
| -1.0120 | 0.3719 | 0.80 |
| -1.0421 | 0.3010 | 0.80 |
| -1.0681 | 0.2285 | 0.80 |
| -1.0883 | 0.1542 | 0.80 |
| -1.0995 | 0.0781 | 0.80 |
| -1.0914 | 0.0020 | 0.80 |
| -0.9953 | 0.0156 | 0.90 |
| -0.9206 | 0.0214 | 0.90 |
| -0.8509 | 0.0513 | 0.90. |
| -0.7839 | 0.0869 | 0.90 |
| -0.7167 | 0.1220 | 0.90 |
| -0.6478 | 0.1538 | 0.90 |
| -0.5768 | 0.1803 | 0.90 |
| -0.5036 | 0.2002 | 0.90 |
| -0.4287 | 0.2125 | 0.90 |
| -0.3530 | 0.2153 | 0.90 |
| -0.2777 | 0.2067 | 0.90 |
| -0.2046 | 0.1867 | 0.90 |
| -0.1351 | 0.1563 | 0.90 |
| -0.0700 | 0.1174 | 0.90 |
| -0.0093 | 0.0719 | 0.90 |
| 0.0473 | 0.0214 | 0.90 |
| 0.1003 | -0.0328 | 0.90 |
| 0.1503 | -0.0899 | 0.90 |
| 0.1976 | -0.1492 | 0.90 |
| 0.2426 | -0.2103 | 0.90 |
| 0.2856 | -0.2728 | 0.90 |
| 0.3270 | -0.3364 | 0.90 |
| 0.3670 | -0.4009 | 0.90 |
| 0.4057 | -0.4661 | 0.90 |

TABLE I-continued

| X Inches | Y Inches | Z % Span |
|---|---|---|
| 0.4433 | −0.5320 | 0.90 |
| 0.4799 | −0.5985 | 0.90 |
| 0.5157 | −0.6654 | 0.90 |
| 0.5509 | −0.7326 | 0.90 |
| 0.5854 | −0.8002 | 0.90 |
| 0.6194 | −0.8680 | 0.90 |
| 0.6529 | −0.9361 | 0.90 |
| 0.6861 | −1.0043 | 0.90 |
| 0.7190 | −1.0727 | 0.90 |
| 0.7517 | −1.1411 | 0.90 |
| 0.7842 | −1.2097 | 0.90 |
| 0.8166 | −1.2783 | 0.90 |
| 0.8490 | −1.3469 | 0.90 |
| 0.8813 | −1.4155 | 0.90 |
| 0.9141 | −1.4839 | 0.90 |
| 0.9482 | −1.5517 | 0.90 |
| 0.9953 | −1.6095 | 0.90 |
| 1.0688 | −1.6126 | 0.90 |
| 1.1186 | −1.5584 | 0.90 |
| 1.1127 | −1.4840 | 0.90 |
| 1.0901 | −1.4116 | 0.90 |
| 1.0661 | −1.3396 | 0.90 |
| 1.0417 | −1.2677 | 0.90 |
| 1.0171 | −1.1960 | 0.90 |
| 0.9924 | −1.1242 | 0.90 |
| 0.9677 | −1.0525 | 0.90 |
| 0.9427 | −0.9808 | 0.90 |
| 0.9176 | −0.9092 | 0.90 |
| 0.8923 | −0.8377 | 0.90 |
| 0.8668 | −0.7662 | 0.90 |
| 0.8411 | −0.6949 | 0.90 |
| 0.8151 | −0.6236 | 0.90 |
| 0.7888 | −0.5524 | 0.90 |
| 0.7621 | −0.4814 | 0.90 |
| 0.7351 | −0.4105 | 0.90 |
| 0.7077 | −0.3397 | 0.90 |
| 0.6799 | −0.2692 | 0.90 |
| 0.6516 | −0.1988 | 0.90 |
| 0.6228 | −0.1286 | 0.90 |
| 0.5934 | −0.0586 | 0.90 |
| 0.5633 | 0.0110 | 0.90 |
| 0.5326 | 0.0804 | 0.90 |
| 0.5010 | 0.1494 | 0.90 |
| 0.4685 | 0.2179 | 0.90 |
| 0.4348 | 0.2859 | 0.90 |
| 0.3999 | 0.3533 | 0.90 |
| 0.3636 | 0.4199 | 0.90 |
| 0.3256 | 0.4856 | 0.90 |
| 0.2857 | 0.5501 | 0.90 |
| 0.2434 | 0.6131 | 0.90 |
| 0.1983 | 0.6741 | 0.90 |
| 0.1499 | 0.7325 | 0.90 |
| 0.0977 | 0.7875 | 0.90 |
| 0.0413 | 0.8382 | 0.90 |
| −0.0197 | 0.8834 | 0.90 |
| −0.0854 | 0.9213 | 0.90 |
| −0.1554 | 0.9504 | 0.90 |
| −0.2288 | 0.9692 | 0.90 |
| −0.3042 | 0.9764 | 0.90 |
| −0.3799 | 0.9718 | 0.90 |
| −0.4540 | 0.9557 | 0.90 |
| −0.5250 | 0.9292 | 0.90 |
| −0.5920 | 0.8937 | 0.90 |
| −0.6543 | 0.8504 | 0.90 |
| −0.7116 | 0.8008 | 0.90 |
| −0.7640 | 0.7460 | 0.90 |
| −0.8119 | 0.6871 | 0.90 |
| −0.8556 | 0.6251 | 0.90 |
| −0.8956 | 0.5606 | 0.90 |
| −0.9325 | 0.4944 | 0.90 |
| −0.9664 | 0.4265 | 0.90 |
| −0.9969 | 0.3570 | 0.90 |
| −1.0233 | 0.2859 | 0.90 |
| −1.0444 | 0.2130 | 0.90 |
| −1.0566 | 0.1382 | 0.90 |
| −1.0498 | 0.0632 | 0.90 |

TABLE I-continued

| X Inches | Y Inches | Z % Span |
|---|---|---|
| −0.9757 | 0.0490 | 0.95 |
| −0.9016 | 0.0557 | 0.95 |
| −0.8324 | 0.0853 | 0.95 |
| −0.7656 | 0.1200 | 0.95 |
| −0.6982 | 0.1537 | 0.95 |
| −0.6290 | 0.1833 | 0.95 |
| −0.5575 | 0.2069 | 0.95 |
| −0.4839 | 0.2230 | 0.95 |
| −0.4091 | 0.2308 | 0.95 |
| −0.3339 | 0.2280 | 0.95 |
| −0.2602 | 0.2127 | 0.95 |
| −0.1899 | 0.1858 | 0.95 |
| −0.1242 | 0.1490 | 0.95 |
| −0.0634 | 0.1047 | 0.95 |
| −0.0068 | 0.0550 | 0.95 |
| 0.0460 | 0.0013 | 0.95 |
| 0.0958 | −0.0552 | 0.95 |
| 0.1428 | −0.1140 | 0.95 |
| 0.1877 | −0.1745 | 0.95 |
| 0.2306 | −0.2364 | 0.95 |
| 0.2719 | −0.2995 | 0.95 |
| 0.3117 | −0.3634 | 0.95 |
| 0.3503 | −0.4281 | 0.95 |
| 0.3879 | −0.4934 | 0.95 |
| 0.4245 | −0.5592 | 0.95 |
| 0.4603 | −0.6255 | 0.95 |
| 0.4954 | −0.6921 | 0.95 |
| 0.5298 | −0.7591 | 0.95 |
| 0.5638 | −0.8263 | 0.95 |
| 0.5973 | −0.8938 | 0.95 |
| 0.6304 | −0.9615 | 0.95 |
| 0.6633 | −1.0293 | 0.95 |
| 0.6958 | −1.0972 | 0.95 |
| 0.7282 | −1.1652 | 0.95 |
| 0.7604 | −1.2333 | 0.95 |
| 0.7925 | −1.3014 | 0.95 |
| 0.8246 | −1.3696 | 0.95 |
| 0.8567 | −1.4377 | 0.95 |
| 0.8891 | −1.5057 | 0.95 |
| 0.9227 | −1.5731 | 0.95 |
| 0.9698 | −1.6302 | 0.95 |
| 1.0428 | −1.6333 | 0.95 |
| 1.0942 | −1.5817 | 0.95 |
| 1.0881 | −1.5078 | 0.95 |
| 1.0656 | −1.4359 | 0.95 |
| 1.0421 | −1.3643 | 0.95 |
| 1.0182 | −1.2929 | 0.95 |
| 0.9942 | −1.2215 | 0.95 |
| 0.9701 | −1.1501 | 0.95 |
| 0.9460 | −1.0788 | 0.95 |
| 0.9217 | −1.0075 | 0.95 |
| 0.8972 | −0.9362 | 0.95 |
| 0.8726 | −0.8650 | 0.95 |
| 0.8477 | −0.7939 | 0.95 |
| 0.8227 | −0.7229 | 0.95 |
| 0.7974 | −0.6519 | 0.95 |
| 0.7718 | −0.5811 | 0.95 |
| 0.7459 | −0.5103 | 0.95 |
| 0.7197 | −0.4397 | 0.95 |
| 0.6932 | −0.3692 | 0.95 |
| 0.6662 | −0.2989 | 0.95 |
| 0.6388 | −0.2287 | 0.95 |
| 0.6110 | −0.1587 | 0.95 |
| 0.5826 | −0.0890 | 0.95 |
| 0.5535 | −0.0194 | 0.95 |
| 0.5238 | 0.0498 | 0.95 |
| 0.4934 | 0.1187 | 0.95 |
| 0.4621 | 0.1872 | 0.95 |
| 0.4298 | 0.2552 | 0.95 |
| 0.3963 | 0.3227 | 0.95 |
| 0.3616 | 0.3896 | 0.95 |
| 0.3254 | 0.4556 | 0.95 |
| 0.2875 | 0.5207 | 0.95 |
| 0.2476 | 0.5846 | 0.95 |
| 0.2051 | 0.6468 | 0.95 |
| 0.1596 | 0.7068 | 0.95 |

TABLE I-continued

| X Inches | Y Inches | Z % Span |
|---|---|---|
| 0.1105 | 0.7640 | 0.95 |
| 0.0575 | 0.8174 | 0.95 |
| −0.0001 | 0.8660 | 0.95 |
| −0.0625 | 0.9081 | 0.95 |
| −0.1297 | 0.9420 | 0.95 |
| −0.2010 | 0.9659 | 0.95 |
| −0.2752 | 0.9784 | 0.95 |
| −0.3505 | 0.9787 | 0.95 |
| −0.4248 | 0.9671 | 0.95 |
| −0.4966 | 0.9447 | 0.95 |
| −0.5647 | 0.9125 | 0.95 |
| −0.6281 | 0.8719 | 0.95 |
| −0.6864 | 0.8243 | 0.95 |
| −0.7397 | 0.7711 | 0.95 |
| −0.7882 | 0.7134 | 0.95 |
| −0.8323 | 0.6524 | 0.95 |
| −0.8726 | 0.5887 | 0.95 |
| −0.9095 | 0.5231 | 0.95 |
| −0.9435 | 0.4559 | 0.95 |
| −0.9742 | 0.3871 | 0.95 |
| −1.0010 | 0.3167 | 0.95 |
| −1.0225 | 0.2446 | 0.95 |
| −1.0355 | 0.1704 | 0.95 |
| −1.0299 | 0.0958 | 0.95 |

In this preferred embodiment of a first stage turbine bucket, there are ninety-two (92) bucket airfoils 36. The root 31 of the bucket airfoil at the midpoint of the platform in a preferred embodiment of the turbine lies at 32.348 inches along a radius from the turbine centerline, i.e., rotor axis 39 (FIG. 1). The actual height of the airfoil 36 in a preferred embodiments hereof, that is, the actual Z height of the bucket, is 7.075 inches from the root 31 at the midpoint of the platform 30 to tip 33. Thus, the tip 33 of the bucket 16 in a preferred embodiment lies 39.423 inches along a radius from the turbine centerline 39. While not forming part of the present invention, each first stage bucket airfoil 36 includes a plurality of internal air-cooling passages, not shown, which exhaust cooling air, into the hot gas path at exit locations 42 adjacent the airfoil tip 33 as illustrated.

It will also be appreciated that the airfoil disclosed in the above Table may be scaled up or down geometrically for use in other similar turbine designs. Consequently, the coordinate values set forth in Table 1 may be scaled upwardly or downwardly such that the airfoil profile shape remains unchanged. A scaled version of the coordinates in Table I would be represented by X and Y coordinate values of Table I, and optionally the non-dimensional Z coordinate value when converted to inches, multiplied or divided by a constant number.

Figure 9:
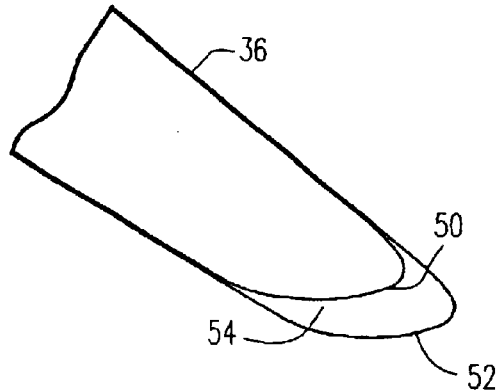
FIG. 9 is a schematic representation illustrating a trailing edge reduction for comparison purposes with a prior known bucket airfoil.
Figure 10:
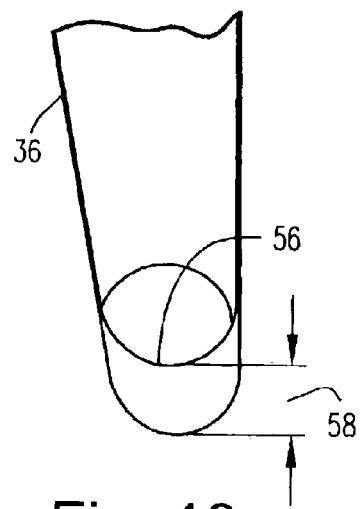
FIG. 10 is a schematic illustration of the trailing edge diameter of the bucket airfoil hereof illustrating its configuration in relation to the prior known bucket.

Referring now to FIGS. 9 and 10, the trailing edge of the airfoil hereof is illustrated at 50. The trailing edge of the prior known bucket is illustrated at 52. It will be appreciated from a review of FIG. 8 that the trailing edge 50 has been cut back from the trailing edge 52 of the prior bucket. The cutback is indicated by the distance 54 between the trailing edges 50 and 52. The cutback extends along the entirety of the height of the trailing edge of the airfoil 36.

Referring to FIG. 10, the trailing edge diameter 56 is provided in Table II below in inches at the trailing edge of the airfoil. The displacement 58 is the distance in inches that the trailing edge is reduced from the conventional bucket design previously noted. The table below thus gives the trailing edge diameters and displacements as a percentage of the span in inches of the airfoil 36. It will be appreciated that by cutting back the trailing edge configuration, an entirely new and different overall airfoil configuration is provided as compared with the prior design. For example, the trailing edge cutback results in a shorter airfoil tangent chord at each span above 0% span, i.e., the tangent chord being the linear distance between the leading edge and the trailing edge.

TABLE II

| Airfoil Partial Height | TE Diameter | Displacement |
|---|---|---|
| 0.000 | 0.0880 | 0 |
| 0.707 | 0.0906 | 0.0726 |
| 1.416 | 0.0885 | 0.1075 |
| 2.123 | 0.0883 | 0.1161 |
| 2.830 | 0.0880 | 0.1223 |
| 3.538 | 0.0876 | 0.1217 |
| 4.245 | 0.0870 | 0.1054 |
| 4.952 | 0.0882 | 0.0822 |
| 5.659 | 0.0878 | 0.0615 |
| 6.368 | 0.0863 | 0.0430 |
| 7.075 | 0.0866 | 0.0297 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket including a bucket airfoil having an airfoil shape, said airfoil having a nominal profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each distance Z, the profile sections at the Z distances, being joined smoothly with one another to form a complete airfoil shape.

2. A turbine bucket according to claim 1 forming part of a first stage of a turbine.

3. A turbine bucket according to claim 1 wherein said airfoil shape lies in an envelope within ±0.150 inches in a direction normal to any airfoil surface location.

4. A turbine bucket according to claim 1 including a platform, the height of the turbine airfoil from a root at a midpoint of the platform to a tip of the airfoil being 7.075 inches.

5. A turbine bucket including a bucket airfoil having an uncoated nominal airfoil profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each Z distance, the profile sections at the Z distances being joined smoothly with one another to form a complete airfoil shape, the X and Y distances being scalable as a function of the same constant or number to provide a scaled-up or scaled-down airfoil.

6. A turbine bucket according to claim 5 wherein the Z distance, when converted to inches, is scalable as a function of said same constant or number.

7. A turbine bucket according to claim 5 forming part of a first stage of a turbine.

8. A turbine bucket according to claim 5 wherein said airfoil shape lies in an envelope within ±0.150 inches in a direction normal to any airfoil surface location.

9. A turbine bucket according to claim 5 including a platform, the height of the turbine airfoil from a root at a midpoint of the platform to a tip of the airfoil being 7.075 inches.

10. A turbine comprising a turbine wheel having a plurality of buckets, each of said buckets including an airfoil having an airfoil shape, said airfoil having a nominal profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define the airfoil profile sections at each distance Z the profile sections at the Z distances being joined smoothly with one another to form a complete airfoil shape.

11. A turbine according to claim 10 wherein the turbine wheel comprises a first stage of the turbine.

12. A turbine according to claim 10 wherein the turbine wheel mounts 92 buckets and X represents a distance parallel to the turbine axis of rotation.

13. A turbine according to claim 10 including a platform, the height of the turbine airfoil from a root at a midpoint of the platform to a tip of the airfoil being 7.075 inches.

14. A turbine according to claim 10 including a platform for said buckets, the radial height between an axial centerline of said turbine wheel and a root of each airfoil at a midpoint of the platform thereof being. 32.348 inches.

15. A turbine according to claim 14 wherein the height of the turbine airfoil from the root at the midpoint of the platform to a tip of the airfoil being 7.075 inches.

16. A turbine comprising a turbine wheel having a plurality of buckets, each of said buckets including an airfoil having an uncoated nominal airfoil profile substantially in accordance with Cartesian coordinate values of X, Y and Z set forth in Table I wherein the Z values are non-dimensional values from 0.05 span to 0.95 span convertible to Z distances in inches by multiplying the Z values by a height of the airfoil in inches, and wherein X and Y are distances in inches which, when connected by smooth continuing arcs, define airfoil profile sections at each distance Z, the profile sections at the Z distances being joined smoothly with one another to form a complete airfoil shape, the X, Y and Z distances being scalable as a function of the same constant or number to provide a scaled-up or scaled-down bucket airfoil.

17. A turbine according to claim 16 wherein the turbine wheel comprises a first stage of the turbine.

18. A turbine according to claim 16 wherein the turbine wheel mounts 92 buckets and X represents a distance parallel to the turbine axis of rotation.

19. A turbine according to claim 16 including platforms for each of said buckets, the height of the turbine airfoil from a root at a midpoint of the platform to a tip of the airfoil being 7.075 inches.

20. A turbine according to claim 16 including platforms for each of said buckets, the radial height between an axial centerline of said turbine wheel and a root of each bucket at a midpoint of the platform thereof being 32.348 inches.

21. A turbine according to claim 20 wherein the height of the turbine airfoil from the root at the midpoint of the platform to a tip of the airfoil being 7.075 inches.

22. A turbine according to claim 16 wherein said airfoil shape lies in an envelope within ±0.150 inches in a direction normal to any airfoil surface location.

\* \* \* \* \*